(12) United States Patent
Schneider

(10) Patent No.: US 10,246,043 B2
(45) Date of Patent: Apr. 2, 2019

(54) OVERHEAD AIRBAG ASSEMBLIES

(71) Applicant: Autoliv ASP, Inc., Ogden, UT (US)

(72) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 15/424,386

(22) Filed: Feb. 3, 2017

(65) Prior Publication Data
US 2018/0222432 A1 Aug. 9, 2018

(51) Int. Cl.
*B60R 21/233* (2006.01)
*B60R 21/207* (2006.01)
(Continued)

(52) U.S. Cl.
CPC .......... *B60R 21/233* (2013.01); *B60R 21/207* (2013.01); *B60R 21/213* (2013.01); *B60R 21/214* (2013.01); *B60R 21/231* (2013.01); *B60R 21/232* (2013.01); *B60R 21/235* (2013.01); *B60R 21/237* (2013.01); *B60R 21/2338* (2013.01); *B60R 21/23138* (2013.01); *B60R 21/261* (2013.01); *B60R 21/262* (2013.01); *B60R 2021/0004* (2013.01); *B60R 2021/0006* (2013.01); *B60R 2021/0009* (2013.01); *B60R 2021/0044* (2013.01); *B60R 2021/0048* (2013.01); *B60R 2021/0058* (2013.01); *B60R 2021/2074* (2013.01); *B60R 2021/2358* (2013.01); *B60R 2021/2359* (2013.01); *B60R 2021/23107* (2013.01); *B60R 2021/23146* (2013.01);
(Continued)

(58) Field of Classification Search
CPC .... B60R 2021/0048; B60R 2021/0058; B60R 2021/0044; B60R 2021/2074; B60R 2021/23107
See application file for complete search history.

(56) References Cited

U.S. PATENT DOCUMENTS 3,722,951 A * 3/1973 Ezquerra ................. B60R 21/02
280/753
3,953,049 A 4/1976 Surace et al.
(Continued)

FOREIGN PATENT DOCUMENTS

DE 19745872 A1 4/1999
DE 19834061 A1 2/2000
(Continued)

OTHER PUBLICATIONS

International Search Report and Written Opinion dated Jun. 15, 2018 for PCT/US2018/051200.

*Primary Examiner* — Nicole T Verley
(74) *Attorney, Agent, or Firm* — Stoel Rives LLP

(57) ABSTRACT

Airbag assemblies including a housing assembly to be mounted above a vehicle occupant position, an inflator, and an inflatable cushion are provided. The inflatable cushion can include first and second lateral chambers and a frontal chamber disposed between the first and second lateral chambers. Airbag assemblies including a first inflatable cushion that is configured to deploy at a first lateral side and forward of a vehicle occupant position and a second inflatable cushion that is configured to deploy at a second lateral side and forward of the vehicle occupant position are also provided.

8 Claims, 16 Drawing Sheets

(51) Int. Cl.
  *B60R 21/213* (2011.01)
  *B60R 21/231* (2011.01)
  *B60R 21/232* (2011.01)
  *B60R 21/2338* (2011.01)
  *B60R 21/235* (2006.01)
  *B60R 21/237* (2006.01)
  *B60R 21/262* (2011.01)
  *B60R 21/214* (2011.01)
  *B60R 21/261* (2011.01)
  *B60R 21/00* (2006.01)

(52) U.S. Cl.
  CPC ............ *B60R 2021/23161* (2013.01); *B60R 2021/23308* (2013.01); *B60R 2021/23386* (2013.01); *B60R 2021/23388* (2013.01); *B60R 2021/23509* (2013.01); *B60R 2021/23566* (2013.01); *B60R 2021/23576* (2013.01); *B60R 2021/2615* (2013.01)

(56) References Cited

U.S. PATENT DOCUMENTS

| | | | |
|---|---|---|---|
| 5,470,103 A | 11/1995 | Vaillancourt et al. | |
| 7,665,761 B1 * | 2/2010 | Green | B60R 21/18 280/730.1 |
| 8,087,690 B2 | 1/2012 | Kim | |
| 8,414,017 B2 * | 4/2013 | Lee | B60R 21/231 280/730.1 |
| 8,579,321 B2 * | 11/2013 | Lee | B60R 21/214 280/729 |
| 8,985,622 B1 * | 3/2015 | Cannon | B60R 21/231 280/730.2 |
| 9,573,553 B2 * | 2/2017 | Ko | B60R 21/233 |
| 9,925,943 B2 * | 3/2018 | Ohno | B60R 21/207 |
| 9,944,246 B2 * | 4/2018 | Ohno | B60R 21/23138 |
| 9,950,687 B2 * | 4/2018 | Kato | B60R 21/207 |
| 10,005,417 B2 * | 6/2018 | Ohno | B60R 21/207 |
| 2004/0183282 A1 | 9/2004 | Schneider et al. | |
| 2010/0237594 A1 * | 9/2010 | Hirth | B60R 21/231 280/730.1 |
| 2012/0080869 A1 | 4/2012 | Lee et al. | |
| 2016/0121839 A1 * | 5/2016 | Ko | B60R 21/233 280/730.1 |
| 2016/0347272 A1 | 12/2016 | Kato et al. | |
| 2017/0015272 A1 | 1/2017 | Ohno et al. | |
| 2017/0136977 A1 * | 5/2017 | Ohno | B60R 21/013 |
| 2017/0282834 A1 * | 10/2017 | Sugie | B60R 21/01512 |
| 2017/0282933 A1 * | 10/2017 | Ohmi | B60R 21/23138 |
| 2017/0291564 A1 * | 10/2017 | Ohmi | B60R 21/237 |
| 2017/0291565 A1 * | 10/2017 | Yamamoto | B60R 21/207 |
| 2017/0291569 A1 * | 10/2017 | Sugie | B60R 21/01552 |

FOREIGN PATENT DOCUMENTS

| | | | |
|---|---|---|---|
| DE | 102014201474 A1 * | 7/2015 | ........... B60R 21/207 |
| DE | 102014004186 A1 | 9/2015 | |
| EP | 2799290 A1 | 11/2014 | |
| FR | 2667831 A1 | 4/1992 | |
| JP | 2017128235 A * | 7/2017 | ........... B60R 21/231 |

* cited by examiner

OVERHEAD AIRBAG ASSEMBLIES

TECHNICAL FIELD

The present disclosure relates generally to the field of automotive protective systems. More specifically, the present disclosure relates to frontal airbag systems that are configured to deploy in response to collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

Figure 1A:
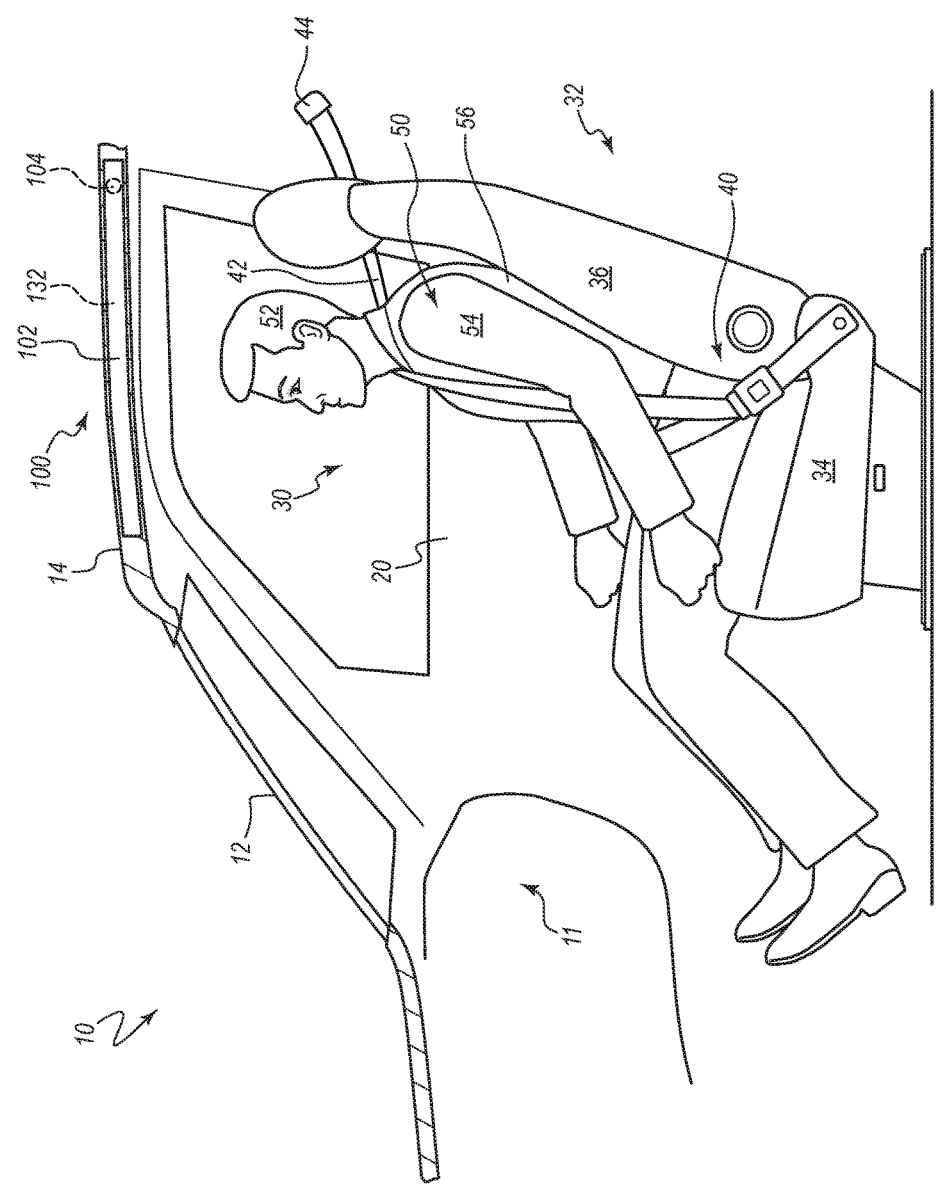
FIG. 1A is a partial side view of an interior side of a vehicle having an inflatable airbag assembly in a packaged configuration, according to one embodiment of the present disclosure.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag assemblies are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" generally refers to an inflatable airbag that deploys from an overhead position (or from a position generally over a vehicle occupant position) to protect an occupant during a collision event. The disclosed airbag assemblies and airbag embodiments may be utilized in place of or in conjunction with other airbags, such as, for example, a front passenger airbag that is typically housed within the dashboard, driver airbags housed within the steering wheel, knee airbags, and side airbags. The disclosed airbag assemblies may also be used in conjunction with one or more of the rear seats of a vehicle (e.g., in an overhead position such as in a seat- or roof-mounted configuration). Further, the disclosed airbag assemblies may be used in an autonomous vehicle (e.g., in a vehicle that may not have a steering wheel and/or that may have limited, or no, reaction surface such as an instrument panel).

As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present.

The term "opposite" is a relational term used herein to refer to a placement of a particular feature or component in a position corresponding to another related feature or component wherein the corresponding features or components are positionally juxtaposed to each other. By way of example, a person's right hand is opposite the person's left hand. An "inboard" component may be situated opposite an "outboard" component.

The term "void" as used herein refers to a volume of space enclosed within the walls of a containing chamber. The containing chamber, or the walls thereof, may be fixed or flexible; hence, the volume of the space enclosed may also be fixed or flexible. For example, an airbag cushion may consist of fabric walls intended to contain a volume of inflation gases within the space between the walls.

The terms "proximal" and "distal" are directional terms used herein to refer to opposite or approximately opposite locations on an airbag cushion. The proximal end or proximal portion of an airbag cushion is the end or portion of the airbag cushion that is nearer the inflator or, in some instances, the housing when the airbag cushion is fully inflated. The distal end or portion is the end or portion of the airbag cushion opposite the proximal end or portion of the airbag cushion, or an end or portion more distant from the inflator or housing than the proximal end or portion. In other words, the terms "proximal" and "distal" are with reference to a point of attachment, such as a point of attachment of the airbag cushion at an airbag assembly housing, and/or a point of attachment of an airbag assembly at a seat back from which an airbag deploys. Specifically, "proximal" is situated toward such point of attachment, and "distal" is situated away from such point of attachment.

During installation, the disclosed airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from a packaged state (e.g., a compact configuration) to a deployed state or an expanded configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Certain embodiments of airbag assemblies that are disclosed herein are particularly well suited for cushioning a front-seat passenger, and may be mounted in a roof of a vehicle, or in a structure above an occupant seating position, or within a seat-back portion of an occupant seat. An airbag assembly can mitigate injury to an occupant of a vehicle during a collision event by reducing the effect of impact of the occupant against structures (body-structure impact) within the vehicle (such as, e.g., a dashboard or door column).

Some embodiments disclosed herein can provide improved positioning, cushioning, and/or safety to occupants involved in particular types of collisions. For example, some embodiments can be particularly suited to cushion a vehicle driver and/or front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test. The conditions for the IIHS small overlap front crash test and the NHTSA oblique impact test are disclosed in the Insurance Institute for Highway Safety, Small Overlap Frontal Crashworthiness Evaluation Crash Test Protocol (Version II) (December 2012); and Saunders, J., Craig, M., and Parent, D., Moving Deformable Barrier Test Procedure for Evaluating Small Overlap/Oblique Crashes, SAE Int. J. Commer. Veh. 5(1):172-195 (2012). As used herein, the term "oblique" when used to describe a collision (crash, impact, etc.) is intended to encompass any of the foregoing described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the car-forward direction.

FIG. 1A is a side view of an interior side of a vehicle 10 having an inflatable airbag assembly 100 depicted in a packaged state, according to one embodiment of the present disclosure. In FIG. 1A, the vehicle 10 includes, among other components, a dashboard 11, a windshield 12, a roof 14, a side door 20, a vehicle occupant position 30 (e.g., a position typically occupied by a vehicle occupant 50 seated in a seat 34), and the airbag assembly 100.

The vehicle occupant position 30 may include at least a portion of a seat assembly 32. The seat assembly 32 may include the seat 34, a seat back 36, and a restraint harness system 40. The restraint harness system 40 can include at least one harness strap 42 and at least one harness upper anchor 44. The harness upper anchor 44 can couple the harness strap 42 to the vehicle 10.

FIG. 1A illustrates the occupant 50 seated in the vehicle occupant position 30 and, more specifically, seated in the seat assembly 32 with the harness system 40 worn. The occupant 50 is facing forward relative to the vehicle 10, seated upright on the seat 34 with head 52 and torso 56 upright, and with the shoulders 54 in a natural position relative to the head 52 and torso 56. The harness strap 42 passes over a shoulder 54 of the occupant 50 and couples to the vehicle 10 at the harness upper anchor 44.

In the embodiment shown, the airbag assembly 100 is configured to be mounted to, or within, the roof 14 of the vehicle 10. The airbag assembly 100 is shown installed in the vehicle 10. The airbag assembly 100 in FIG. 1A is compacted and undeployed (e.g., in the packaged state). The airbag assembly 100 may include a housing 102. The housing 102 may be coupled to the roof 14 by any suitable means. The housing 102 may include an airbag inflator 104. The airbag inflator 104 may consist of one or more inflation mechanisms and channels and/or conduits to guide, direct, and/or transport inflation gases from the inflator 104 to the airbag cushion (not shown, but see, e.g., 110 in FIGS. 1B-1E). The inflator 104 may be at least partially disposed within the housing 102.

The airbag assembly 100 may also include a releasable anchor 132. The releasable anchor 132 may mechanically couple the airbag cushion 110 to the housing 102 or roof 14 in the packaged state, through the deployment phase (e.g., from the moment any sensor initiates the inflator 104 to begin delivering inflation gases to the airbag cushion 110 until the airbag cushion 110 is fully inflated and positioned), and for a discrete period of time following a collision event, after which, the releasable anchor 132 may release the airbag cushion 110 to accommodate egress of the occupant 50 (or access to the occupant 50 by a first responder) after the collision.

Figure 1B:
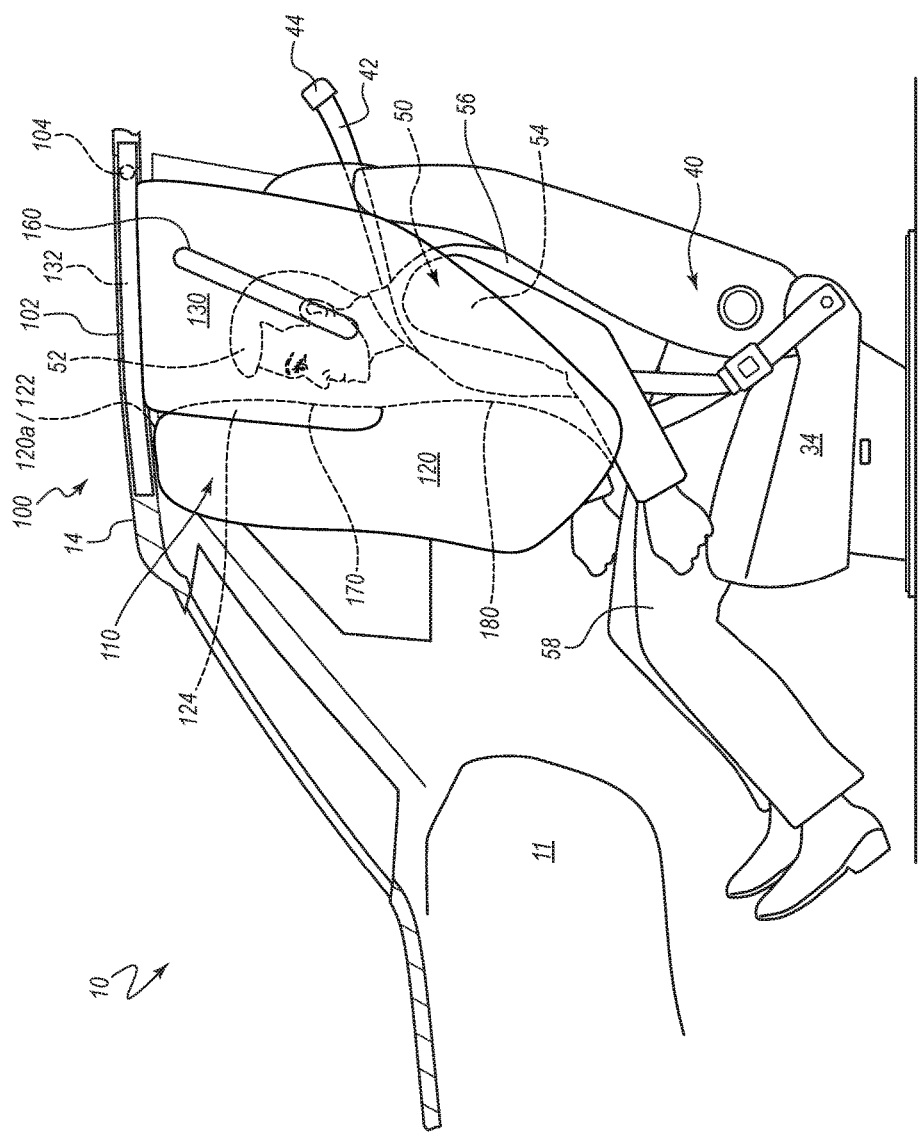
FIG. 1B is a side view of the inflatable airbag assembly of FIG. 1A in a deployed configuration.

FIG. 1B is a side view of the interior of the side of the vehicle 10 having the inflatable airbag assembly 100 of FIG. 1A in the deployed state prior to engagement with the occupant 50. The occupant 50 is seated in the vehicle occupant position 30 in an upright and forward-facing position prior to movement to engage the airbag cushion 110. The airbag assembly 100 includes at least the housing 102, the inflator 104, and the airbag cushion 110. In the embodiment shown, the housing 102 is configured to be mounted to, or within, the roof 14 of the vehicle 10. In some embodiments, the airbag cushion 110 may be constructed from a single panel of fabric and formed by a combination of cuts and seams. In other embodiments, the airbag cushion 110 may be constructed from multiple panels of fabric coupled together at seams. Seams may be formed by sewing, taping, adhesive, radio frequency (RF) welding, or any other suitable method. The airbag cushion 110 may be configured to receive inflation gases from the inflator 104 to expand and deploy the airbag cushion 110 from a packaged condition within the housing 102 to a deployed configuration. Deployment of the airbag cushion 110 may be in a generally downward direction relative to the vehicle 10. The combination of fabric panel(s) and seams forming the airbag cushion 110 may allow the airbag cushion 110 to define a void which may be filled by inflation gases to inflate the airbag cushion 110. The airbag cushion 110 may include a frontal chamber 120, an inboard or first lateral chamber 130, and an outboard or second lateral chamber 140 (not shown in FIG. 1B, but see, e.g., FIGS. 1C and 1D). The first lateral chamber 130 and the second lateral chamber 140 may be positioned opposite each other. In other words, the first lateral chamber 130 and the second lateral chamber 140 may be on opposite sides of the frontal chamber 120. The frontal chamber 120 couples to the first lateral chamber 130 at an inboard coupling 121. The frontal chamber 120 also couples to the second lateral chamber 140 at an outboard coupling 123. The frontal chamber 120 is in fluid communication with the two lateral chambers 130, 140 via the couplings 121, 123 (not shown, but see, e.g., FIG. 1D). In other words, the inboard lower lateral rear edge of the frontal chamber 120 is in fluid communication with the lower forward portion of the first lateral chamber 130 via coupling 121; and the outboard lower lateral rear edge of the frontal chamber 120 is in fluid communication with the lower forward portion of the second lateral chamber 140 via coupling 123. The frontal chamber 120 may include an upper portion providing a head receiving area 170, and a lower portion providing a torso receiving area 180.

Figure 1C:
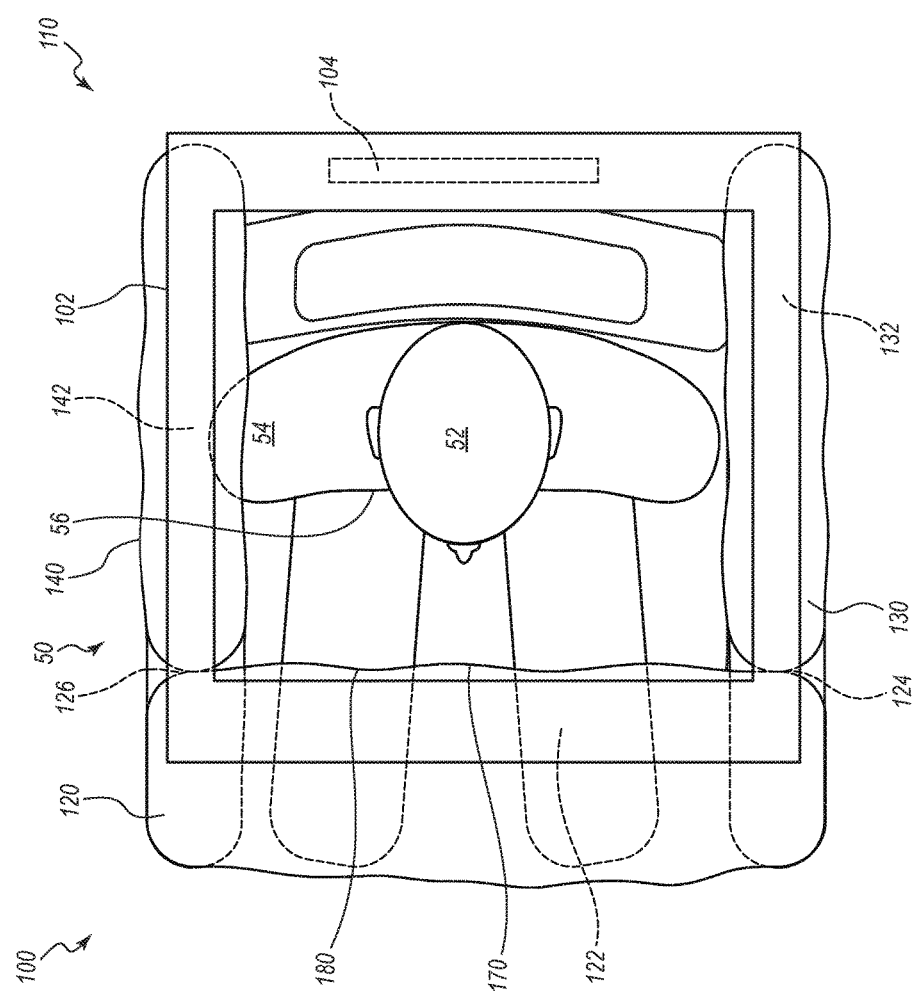
FIG. 1C is an overhead view of the inflatable airbag assembly of FIG. 1A in the deployed configuration.
Figure 1D:
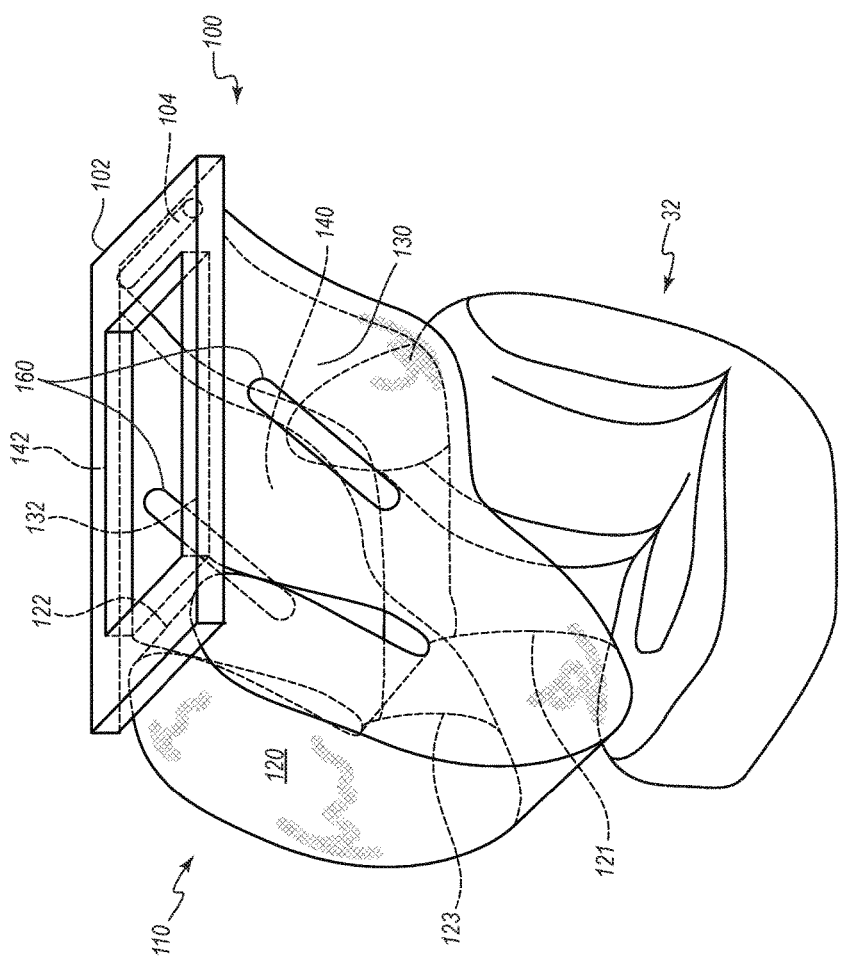
FIG. 1D is a perspective view of the inflatable airbag assembly of FIG. 1A in the deployed configuration.

In the embodiment shown, the airbag cushion 110 couples to the housing 102 at an inboard releasable anchor 132 and at an outboard releasable anchor 142 (not shown in FIG. 1B, but see, e.g., FIGS. 1C and 1D). More specifically, the first lateral chamber 130 couples to the housing 102 or roof 14 at the inboard releasable anchor 132. The second lateral chamber 140 couples to the housing 102 or roof 14 at the outboard releasable anchor 142. (The releasable anchors 132, 142 are further described below.)

In the embodiment shown, when a collision event triggers the inflator 104 to deliver inflation gases to the inflatable airbag cushion 110, the inflation gases may first enter the first and second lateral chambers 130, 140. The first and second lateral chambers 130, 140 may be in fluid communication with the frontal chamber 120, allowing the inflation gases to pass through the first and second lateral chambers 130, 140 and into the frontal chamber 120.

When deployed, the lateral chambers 130, 140 may be disposed to either side of the head 52 of the occupant 50. The second lateral chamber 140 may be disposed above the harness strap 42 which passes over the outboard shoulder 54 of the occupant 50 and is anchored to the vehicle 10 at the harness upper anchor 44. The frontal chamber 120 of the airbag cushion 110 may be disposed immediately forward of the vehicle occupant position 30 so as to be positioned to interface with the head 52, torso 56, and possibly the shoulders 54 of the occupant 50. In some embodiments, the frontal chamber 120 of the airbag cushion 110 may not interact with the lap/legs 58 of the occupant 50. In other words, the lower extent of the frontal chamber 120 may be disposed above but not in line with the lap/legs 58 of the occupant 50 when the occupant 50 is in the vehicle occupant position 30 shown. In some embodiments, the fully deployed airbag cushion 110 may not contact the dashboard 11 prior to contact with the occupant 50.

The frontal chamber 120 of the airbag cushion 110 may include the head receiving area 170 configured to interface with the head 52 of the occupant 50 (e.g., during a collision event). The head receiving area 170 may cushion the head 52 of the occupant 50 during a collision event to prevent or reduce injury from impact with vehicle structures or components. The frontal chamber 120 may also include the torso receiving area 180. The torso receiving area 180 may be configured to interface with the torso 56 of the occupant 50 and to support and cushion the torso 56 during a collision event to prevent or reduce injury from impact with vehicle structures or components. The combination of the head receiving area 170 and torso receiving area 180 of the frontal chamber 120 may allow the occupant 50 to be supported in such a way that the head 52 and torso 56 move generally together during a collision event, thereby reducing or preventing potential neck or spinal injury.

In some embodiments, the frontal chamber 120 of the airbag cushion 110 may be releasably coupled at an upper portion of the frontal chamber 120 to the roof 14, or, more specifically, to a forward portion of the housing 102 to form a center releasable coupling mechanism 122 at the upper edge 120a of the frontal chamber 120. In other embodiments, the upper edge 120a of the frontal chamber 120 may not couple to the housing 102. In at least some embodiments, the frontal chamber 120 may be releasably coupled at a rear lateral edge of the frontal chamber 120 to a forward portion of either lateral chamber 130, 140 to form an inboard releasable coupling mechanism 124 and an outboard releasable coupling mechanism 126 (not shown in FIG. 1B, but see, e.g., FIG. 1C).

Each releasable coupling mechanism 122, 124, 126 may be formed by any suitable means such that the coupling mechanisms 122, 124, 126 remain intact through the deployment and inflation phase of the airbag cushion 110 and may separate or release during the occupant/airbag interface phase to permit the airbag cushion 110 to conform to the occupant 50 during the interface phase and through ride down. For example, the releasable coupling mechanism may include a tear stitch, which may separate or uncouple as a result of the occupant 50 impacting the frontal chamber 120. In some embodiments, a releasable coupling mechanism may include a releasable tether, which may release or at least partially release as a result of the occupant 50 impacting the frontal chamber 120. In certain embodiments, the frontal chamber 120 of the airbag cushion 110 may not be coupled to the roof 14 and/or to the forward portion of the housing 102 (e.g., the airbag cushion 110 may lack releasable tethers). In some embodiments, a releasable coupling mechanism may include an elastic tether, which may deform or stretch as a result of the occupant 50 impacting the frontal chamber 120. In some embodiments, a combination (or variety) of types of releasable coupling mechanisms 122, 124, 126 may be employed. During a collision event, the releasable coupling mechanisms 122, 124, 126 may assist in disposing and positioning the airbag cushion 110 and, more specifically, the frontal chamber 120 through the inflation phase. When the occupant 50 interfaces the airbag cushion 110, one or more of the releasable coupling mechanisms 122, 124, 126 may release to permit the airbag cushion 110 to conform to the occupant 50. During ride down of the occupant, the releasable coupling mechanisms 122, 124, 126 may release, or may further release, to facilitate the ride down.

In certain embodiments, there may be no releasable coupling mechanisms 122, 124, 126; however, the geometry of the frontal chamber 120 and the lateral chambers 130, 140 may serve to correctly dispose and position the airbag cushion 110 to receive the occupant 50 during a collision and reduce or prevent injury.

The center releasable coupling mechanism 122 and the inboard/outboard releasable coupling mechanisms 124, 126 may assist the frontal chamber 120 to be disposed immediately forward of the occupant 50 and to maintain this disposition until the occupant 50 contacts the airbag cushion 110 during a collision event. The frontal chamber 120 may include the head receiving area 170, and may also include the torso receiving area 180. The frontal chamber 120 may be configured such that the head receiving area 170 is disposed directly forward of the head 52 of the occupant 50. The frontal chamber 120 may be configured such that the torso receiving area 180 is disposed directly forward of the torso 56 of the occupant 50. The head receiving area 170 and the torso receiving area 180 may each be configured specifically to receive, respectively, the head 52 and torso 56 of the occupant 50 and/or to cushion the head 52 and torso 56 differentially during ride down.

The lateral chambers 130, 140 may include a non-inflatable portion in the middle region 160 of each of the lateral chambers 130, 140. In some embodiments, the non-inflatable middle region 160 may be a zero-length tether. A zero-length tether may be formed by any suitable means. For example, a zero-length tether may be formed by interweaving the fabric of the two longitudinal facing panels of a lateral chamber. Alternatively, a zero-length tether may be a seam or series of seams which couples the two opposing panels of a lateral chamber. The non-inflatable middle region 160 may limit the lateral expansion of each lateral chamber 130, 140 during inflation. The non-inflatable middle region 160 may also limit or reduce the lateral expansion or deformity of each lateral chamber 130, 140 during interface with the occupant 50 and ride down. Limiting lateral expansion of the lateral chambers 130, 140 may assist in properly deploying and positioning the frontal chamber 120, and may reduce the amount of the inflation gases to be delivered by the inflator 104. Limiting lateral expansion of the lateral chambers 130, 140 during ride down may assist in retaining inflation gases within the frontal chamber 120 to provide adequate support and cushioning of the head 52 and torso 56 of the occupant 50. In some embodiments, the non-inflatable middle region 160 may direct inflation gas through the first and second lateral chambers 130, 140 during deployment of the inflatable airbag cushion 110.

In some embodiments, the airbag assembly 100 may reduce need for a side airbag. However, as can be appreciated, some embodiments may further include side airbags and/or side portions that also extend downward from the lateral chambers to provide oblique and/or side impact torso and/or pelvis protection.

FIG. 1C is an overhead view of the airbag assembly 100 of FIG. 1A in a deployed state. The occupant 50 is seated in an upright and forward-facing position, and has not yet contacted the airbag cushion 110. The airbag housing 102 is shown in a roof-mounted position. (The roof is not shown, but see, e.g., 14 in FIGS. 1A and 1B.) The airbag housing 102 may take the form of a hollow square, ring, or other suitable shape. In other words, the airbag housing 102 may be arranged so as to allow other roof-mounted features or accessories, such as, e.g., a sun roof opening (not shown). As illustrated, the airbag cushion 110 has been deployed by action of the inflator 104. The airbag cushion 110 includes the frontal chamber 120, the first lateral chamber 130, and the second lateral chamber 140. The airbag cushion 110 may couple to the airbag housing 102 or roof 14 at anchors 132, 142, and at a center releasable coupling mechanism 122. More specifically, the first lateral chamber 130 may couple to the inboard anchor 132, and the second lateral chamber 140 may couple to the outboard anchor 142. The anchors 132, 142 may be releasable anchors. The frontal chamber 120 may couple to a forward portion of the airbag housing 102 or roof 14 at the center releasable coupling mechanism 122. The frontal chamber 120 may also couple to the two lateral chambers 130, 140. In other words, an inboard rear portion of the frontal chamber 120 may releasably couple at the releasable coupling mechanism 124 to the first lateral chamber 130, and an outboard rear portion of the frontal chamber 120 may releasably couple at the releasable coupling mechanism 126 to the second lateral chamber 140. The releasable coupling mechanisms 122, 124, 126 may release or partially release upon contact of the occupant 50 with the airbag cushion 110. The releasable coupling mechanisms 122, 124, 126 may partially release or further release during ride down of the airbag cushion 110 by the occupant 50.

The anchor 132 may couple the first lateral chamber 130 of the airbag cushion 110 to the airbag housing 102. The anchor 142 may couple the second lateral chamber 140 of the airbag cushion 110 to the airbag housing 102. In some embodiments, the anchors 132, 142 may be releasable. In an embodiment wherein the anchors 132, 142 are releasable, the anchors 132, 142 couple the airbag cushion 110 to the airbag housing 102 in a fixed manner throughout a collision event. The releasable anchors 132, 142 may be configured to release the airbag cushion 110 from the airbag housing 102 after a fixed period of time following a collision event to permit the occupant 50 to exit the vehicle 10, or to permit a first responder to access and assist the occupant 50 while still in the vehicle 10 after a collision. The airbag cushion 110 may couple to the anchors 132, 142 by any suitable method. For example, the releasable anchors 132, 142 may include a type of spring-release mechanism which may be released at a specific time following a collision event. In other embodiments, the releasable anchors 132, 142 may include explosive bolts which may be triggered at a specific time following a collision event.

The frontal chamber 120 of the airbag cushion 110, in the embodiment shown, includes the head receiving area 170 and the torso receiving area 180. The head receiving area 170 is disposed immediately forward of the head 52 of the occupant 50. The torso receiving area 180 is disposed immediately forward of the torso 56 of the occupant 50.

The first lateral chamber 130 is disposed to the inboard side of the head 52 of the occupant 50. The second lateral chamber 140 is disposed to the outboard side of the head 52 of the occupant 50. In at least some embodiments, the lateral chambers 130, 140 are disposed above the shoulders 54 of the occupant 50. In some embodiments, the lateral chambers 130, 140 may be disposed directly above the shoulders 54 of the occupant 50. In other embodiments, the lateral chambers 130, 140 may be disposed to either side of the shoulders 54 of the occupant 50.

FIG. 1D is a perspective view of the airbag assembly 100 of FIG. 1A in a deployed state. The seat assembly 32 is shown. The airbag housing 102 is depicted in a roof-mounted position. (The roof is not shown, but see, e.g., 14 in FIGS. 1A and 1B.) The airbag cushion 110 is deployed and fully inflated. In the embodiment shown, the airbag cushion 110 includes the frontal chamber 120, the first lateral chamber 130, and the second lateral chamber 140. The airbag cushion 110 is coupled to the housing 102 at the anchors 132, 142.

The frontal chamber 120 of the airbag cushion 110 is disposed above the seat assembly 32 and immediately forward of the vehicle occupant position (not shown, but see, e.g., 30 in FIG. 1A). The frontal chamber 120 may couple to the housing 102 or roof 14 at the releasable coupling mechanism 122. The frontal chamber 120 may also couple to the first lateral chamber 130 and second lateral chamber 140 at inboard and outboard releasable coupling mechanisms (not shown, but see, e.g., 124 and 126 in FIG. 1C). During deployment and inflation, the releasable coupling mechanisms 122, 124, 126 may assist in properly disposing the frontal chamber 120. The releasable coupling mechanisms 122,124, 126 may release or partially release upon contact of the frontal chamber 120 by the occupant 50, and may further release during ride down.

Figure 1E:
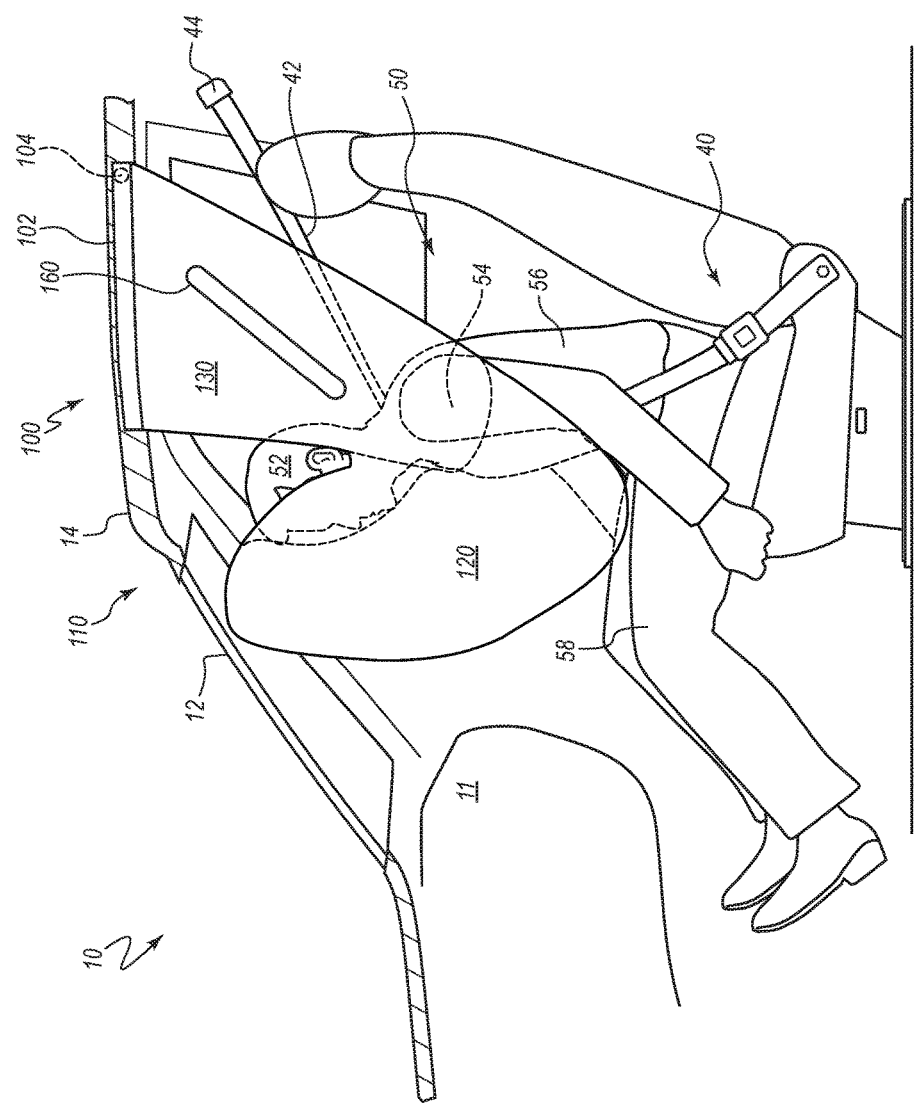
FIG. 1E is a partial side view of the interior of the vehicle equipped with the inflatable airbag assembly of FIG. 1A, the airbag cushion in the deployed configuration, and the occupant in contact with the airbag cushion during ride down.

FIG. 1E is a partial side view of the interior of the vehicle 10 equipped with the airbag assembly 100 of FIG. 1A, with the airbag cushion 110 deployed, and the occupant 50 is in contact with the airbag cushion 110 during ride down. The occupant 50 is depicted partially restrained by the harness system 40. The harness strap 42 passes over the outboard shoulder 54 of the occupant 50 and couples to the vehicle 10 at the harness upper anchor 44. While the embodiment shown illustrates the occupant 50 partially restrained by the harness system 40, the airbag cushion 110 is neither aided substantially nor impeded by use of the harness system 40.

The head receiving area 170 and the torso receiving area 180 may each be configured specifically to receive, respectively, the head 52 and torso 56 of the occupant 50 and may cushion the head 52 and torso 56 differentially during ride down. More specifically, the head receiving area 170 may be configured specifically for the lighter mass of the head 52 of the occupant 50, while the torso receiving area 180 may be configured specifically for the greater mass of the torso 56 of the occupant 50 such that the head 52 and torso 56 may ride down on the airbag cushion 110 more or less uniformly. The frontal chamber 120 may effectively pivot or rotate to conform to the occupant 50 during ride down, with the head receiving area 170 rotating forward and downward to protect and cushion the head 52, while the torso receiving area 180 may rotate forward to a different degree to support the greater mass and energy of the torso 56 of the occupant 50.

As illustrated, the inflated airbag cushion 110 is partially deformed to conform to the occupant 50 during ride down. The frontal chamber 120 has effectively rotated forward and downward in response to the head 52 and torso 56 of the occupant 50. The head receiving area 170 of the frontal chamber 120 has received, and is supporting and cushioning, the head 52 of the occupant 50. The torso receiving area 180 of the frontal chamber 120 has received, and is cushioning and supporting, the torso 56 of the occupant 50. The releasable coupling mechanisms (not shown, but see, e.g., 122, 124 and 126 in FIGS. 1B and 1C) have at least partially released to allow the frontal chamber 120 to conform to the occupant 50 and to support and cushion the occupant 50 during ride down. In some embodiments, the frontal chamber 120 does not contact the windshield 12 during ride down. In other embodiments, the frontal chamber 120 may contact the windshield 12. In some embodiments, the frontal chamber 120 does not contact the dashboard 11. In other embodiments, the frontal chamber 120 may contact the dashboard 11. In some embodiments, the frontal chamber 120 may deploy above but not in contact with the lap/legs 58 of the occupant 50. During ride down, or as a result of collision energies, the lap/legs 58 of the occupant 50 and the frontal chamber 120 may come into contact and may mutually support each other, thereby providing an added degree of protection to the occupant 50.

During ride down, the first lateral chamber 130 may flex or deform to support the frontal chamber 120 as the frontal chamber 120 adjusts to conform to the head 52 and torso 56 of the occupant 50. The second lateral chamber (not shown, but see, e.g., 140 in FIGS. 1C and 1D) may also flex or deform to support the frontal chamber 120 as the frontal chamber 120 adjusts to conform to the head 52 and torso 56 of the occupant 50. The lateral chambers 130, 140 may also provide protection from injury resulting from impact with laterally disposed components of the vehicle 10.

Figure 2:
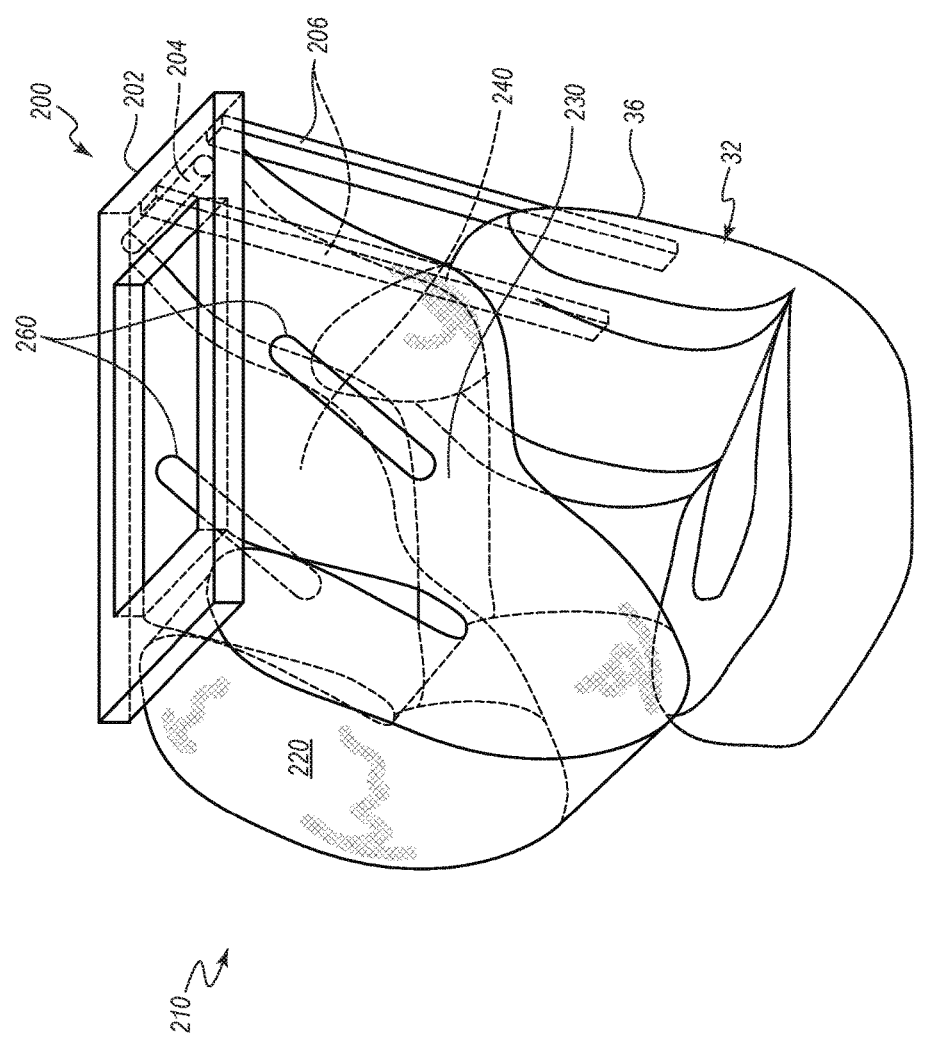
FIG. 2 is a perspective view of a vehicle seat assembly having another embodiment of an airbag system mounted above the vehicle seat assembly in a deployed configuration.

FIG. 2 depicts an embodiment of an airbag assembly that resembles the airbag assembly 100 described above in certain respects. Accordingly, like features are designated with like reference numerals, with the leading digits incremented to "2." For example, the embodiment depicted in FIG. 2 includes an airbag cushion 210 that may, in some respects, resemble the airbag cushion 110 of FIGS. 1A-1E. Relevant disclosure set forth above regarding similarly identified features thus may not be repeated hereafter. Moreover, specific features of the airbag assembly 100 and related components shown in FIGS. 1A-1E may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag system and related components depicted in FIG. 2. Any suitable combination of the features, and variations of the same, described with respect to the airbag assembly 100 and related components illustrated in FIGS. 1A-1E can be employed with the airbag assembly 200 and related components of FIG. 2, and vice versa. This pattern of disclosure applies equally to further embodiments depicted in subsequent figures and described hereafter, wherein the leading digits may be further incremented.

FIG. 2 is a perspective view of the vehicle seat assembly 32, showing an inflatable airbag assembly 200 (similar to the airbag assembly 100 of FIG. 1A) in a deployed state. The inflatable airbag assembly 200 is a seat-mounted embodiment that is mounted above the seat assembly 32 via risers 206. The airbag assembly 200 includes a housing 202, an inflator 204, and the airbag cushion 210. The housing 202 is mounted to one or more risers 206, which are coupled to the seat assembly 32 in a suitable manner. The housing 202 may be in the form of a hollow square or ring to allow other, roof-mounted features to be incorporated into the vehicle, such as, e.g., a sun roof (not shown).

In the embodiment shown, two risers 206 are coupled to the rear of the seat assembly 32 and support the housing 202 above the seat assembly 32. In some embodiments, a single riser 206 may couple to the seat assembly 32 and support the housing 202 above the seat assembly 32. In yet other embodiments, more than two risers 206 may couple to the seat assembly 32 and support the housing 202 above the seat assembly 32.

In the embodiment shown, the two risers 206 are coupled to the rear of the seat assembly 32 and support the housing 202 above the seat assembly 32. In other embodiments, the riser(s) 206 may couple to the seat assembly 32 in a different manner. For example, the riser(s) 206 may first attach internally to the seat back 36, and then rise above the seat assembly 32 to support the housing 202. Alternatively, the risers 206 may attach to either side of the seat back 36. In some embodiments, a riser 206 may be incorporated within another structure of the vehicle, such as, e.g., a door frame or window frame (not shown).

The airbag cushion 210 includes a frontal chamber 220, an inboard or first lateral chamber 230, and an outboard or second lateral chamber 240. The frontal chamber 220 may releasably couple to the housing 202 and to the two lateral chambers 230, 240. In the embodiment shown, each of the two lateral chambers 230, 240 includes a non-inflatable middle region 260. The two lateral chambers 230, 240 are in fluid communication with the frontal chamber 220.

Figure 3A:
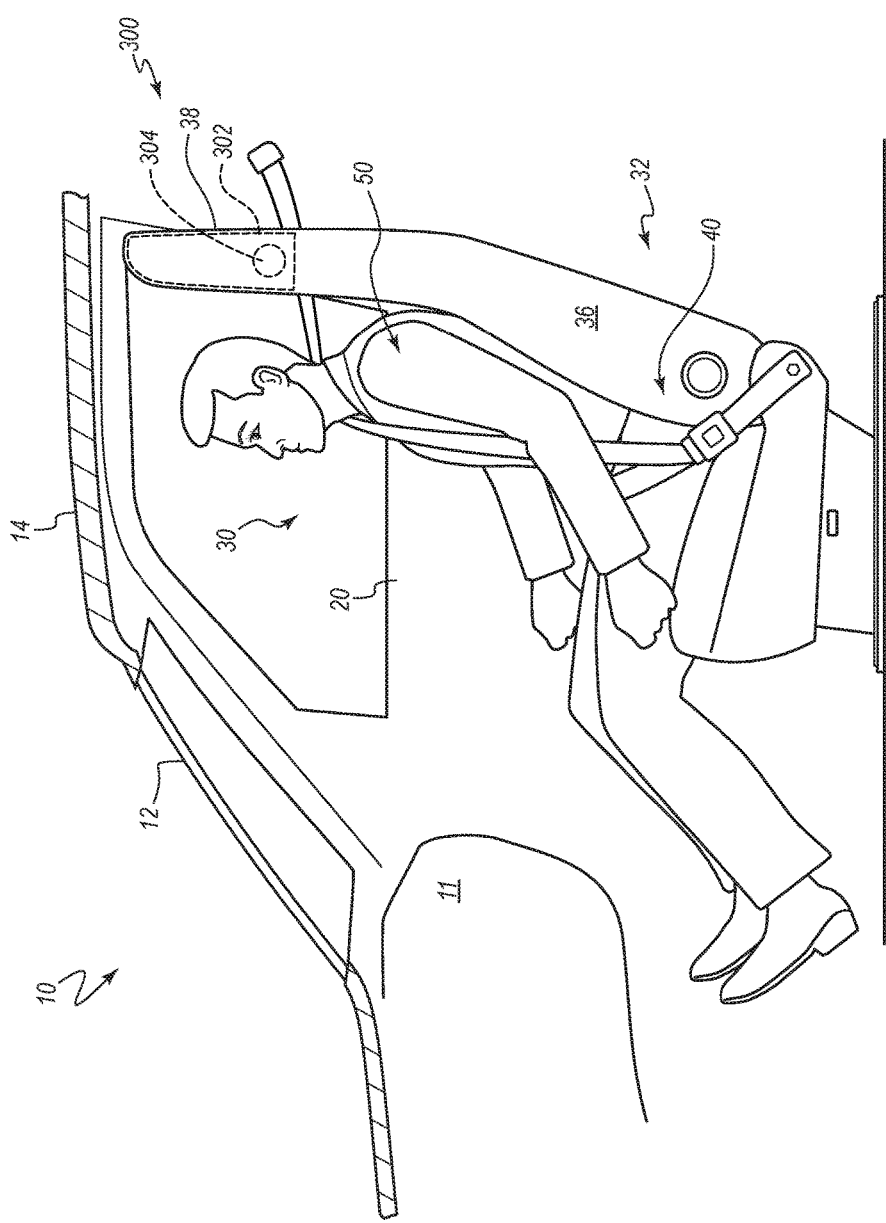
FIG. 3A is a partial side view of the interior of a vehicle having another embodiment of an inflatable airbag system mounted in the seat assembly.

FIG. 3A is a partial side view of the interior of the vehicle 10 with an inflatable airbag assembly 300 (similar to the airbag assembly 100 of FIG. 1A) mounted in the seat assembly 32 in a packaged state. The airbag assembly 300 includes a housing 302, an inflator 304, and an airbag cushion 310. The housing 302 is mounted in the seat back 36 and/or a head rest 38 of the seat assembly 32. The occupant 50 is seated facing forward in the seat assembly 32. As depicted, the airbag cushion 310 is compacted in a packed, undeployed state. The dashboard 11, windshield 12, roof 14, door 20, vehicle occupant position 30, seat assembly 32, and harness system 40 of the vehicle 10 are shown for reference.

In the embodiment shown, the inflator 304 is mounted within the housing 302. In another embodiment, the inflator 304 may be mounted outside or partially outside the housing 302 and internally to the seat back 36 and/or the head rest 38.

Figure 3B:
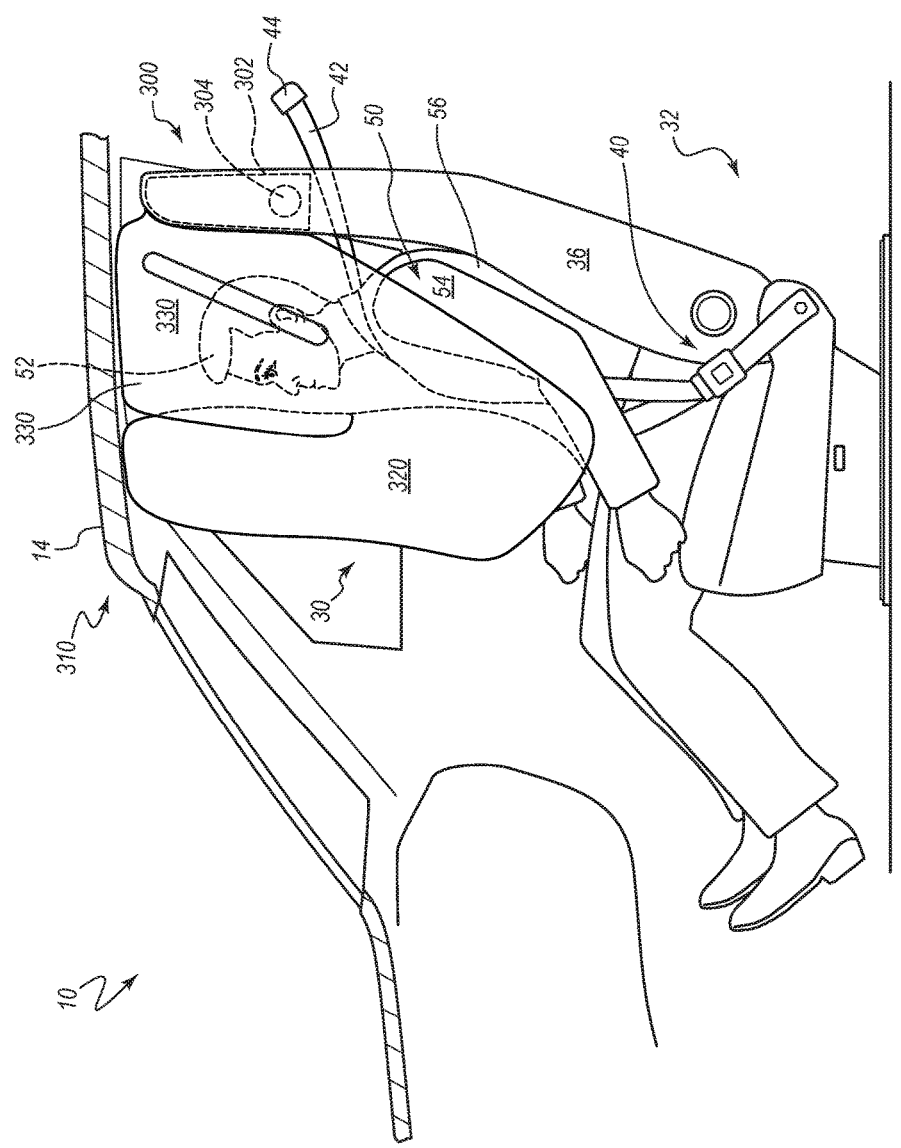
FIG. 3B is a partial side view of the interior of the side of the vehicle having the inflatable airbag system of FIG. 3A in the deployed configuration prior to engagement by the occupant.

FIG. 3B is a partial side view of the interior of the side of the vehicle 10, showing the inflatable airbag assembly 300 of FIG. 3A in the deployed state prior to engagement with the occupant 50. The airbag cushion 310 has been inflated and deployed by operation of the inflator 304. The airbag cushion 310 includes at least a frontal chamber 320, a first lateral chamber 330 and a second lateral chamber (not shown, but see, e.g., 340 in FIGS. 3C and 3D).

Prior to deployment from the housing 302, the airbag cushion 310 is packaged in a manner to control the deployment of the airbag cushion 310. In other words, the airbag cushion 310 may be folded or otherwise arranged in its packaged state so that the frontal chamber 320 will deploy forward toward the windshield 12 before disposing downward in front of the occupant 50. The lateral chambers 330, 340 are in fluid communication with the frontal chamber 320.

The harness system 40 includes at least the harness strap 42 and harness upper anchor 44. The harness strap 42 and harness upper anchor 44 are positioned such that, when properly in use by the occupant 50, the harness strap 42 passes over the shoulder(s) 54 of the occupant 50 beneath the deployed airbag cushion 310, then outboard from the vehicle occupant position 30 to the harness upper anchor 44. In other words, the harness strap 42 does not interfere with the airbag cushion 310, nor does the airbag cushion 310 interfere with the harness system 40.

Figure 3C:
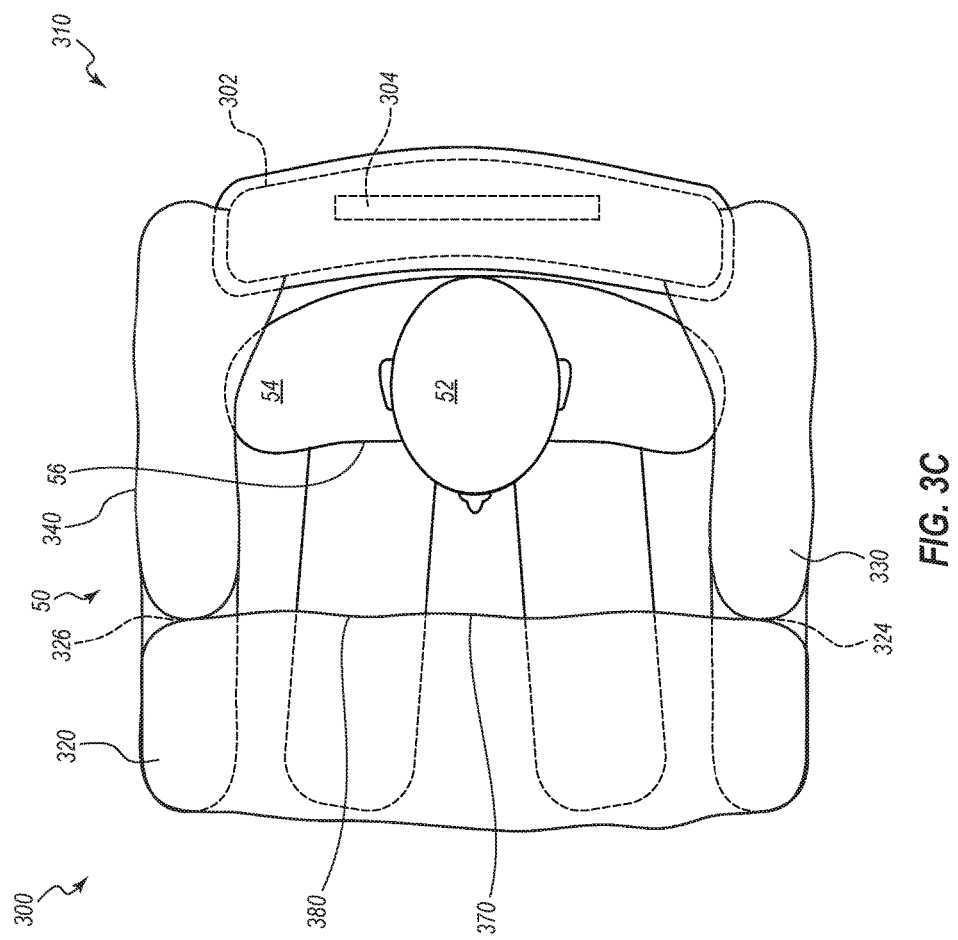
FIG. 3C is an overhead view of the inflatable airbag system of FIG. 3A in a deployed configuration and prior to engagement by the occupant.

FIG. 3C is an overhead view of the airbag assembly 300 of FIG. 3A in a deployed state and prior to engagement of the occupant 50. The airbag cushion 310 has been deployed from the housing 302 by operation of the inflator 304. The frontal chamber 320 is disposed in front of the occupant 50, and includes at least a head receiving area 370 and a torso receiving area 380. The frontal chamber 320 may be releasably coupled to the two lateral chambers 330, 340 via an inboard releasable coupling mechanism 324 and an outboard releasable coupling mechanism 326.

In the embodiment shown, the inboard releasable coupling mechanism 324 may couple together an inboard aft aspect of the frontal chamber 320 and a forward aspect of the first lateral chamber 330. The outboard releasable coupling mechanism 326 may couple together an outboard aft aspect of the frontal chamber 320 and a forward aspect of the second lateral chamber 340. In the deployed state prior to engagement, the releasable coupling mechanisms 324, 326 have not released. During inflation and deployment, the releasable coupling mechanisms 324, 326 may assist in properly disposing the frontal chamber 320 in front of the occupant 50.

The two lateral chambers 330, 340 dispose to either side of the head 52 of the occupant 50. In some embodiments, the two lateral chambers 330, 340 may be disposed at least partially over the shoulders 54 of the occupant 50. In other embodiments, the two lateral chambers 330, 340 may be disposed to either side of the shoulders 54 of the occupant 50 (when the occupant 50 is in the vehicle occupant position 30).

Figure 3D:
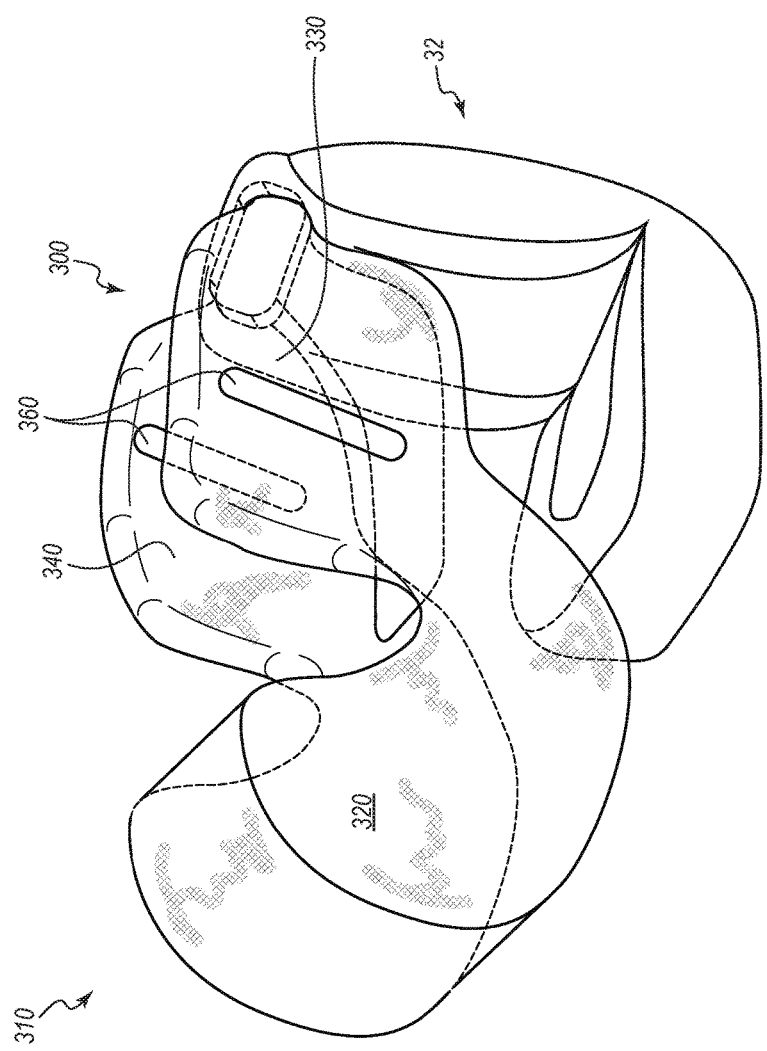
FIG. 3D is a perspective view of the inflatable airbag system of FIG. 3A in a deployed configuration.

FIG. 3D is a perspective view of the airbag assembly 300 of FIG. 3A in a deployed state. The airbag cushion 310 is fully inflated and deployed, and is shown with the frontal chamber 320 at least partially decoupled from the lateral chambers 330, 340. The seat assembly 32 is shown for reference.

Figure 3E:
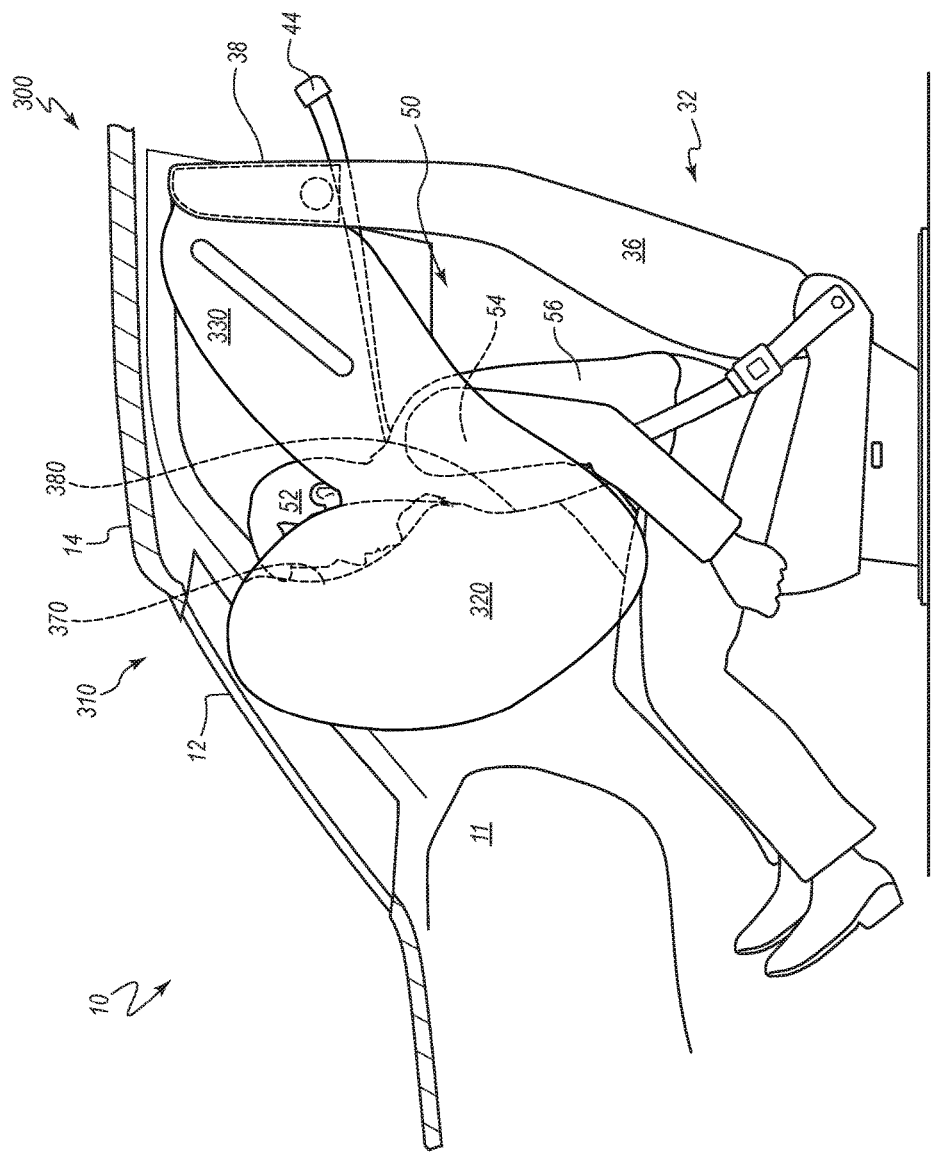
FIG. 3E is a partial side view of the interior side of the vehicle with the inflatable airbag system of FIG. 3A in a deployed configuration and engaged by the occupant.

The frontal chamber 320 is shown having at least partially rotated to conform to, and to support and cushion, the occupant (not shown, but see, e.g., 50 on FIG. 3E). The two lateral chambers 330, 340 are shown relative to the frontal chamber 320 and the seat assembly 32. Non-inflatable middle regions 360 in either lateral chamber 330, 340 are also shown as they may be formed in at least one embodiment. The non-inflatable regions may be formed in a different configuration in other embodiments.

FIG. 3E is a partial side view of the interior side of the vehicle 10 with the airbag cushion 310 of FIG. 3A in a deployed state and engaged by the occupant 50. As depicted, the frontal chamber 320 has received the head 52 and torso 56 of the occupant 50 as a result of collision energies and is in ride down. The head 52 of the occupant 50 has engaged the head receiving area 370 of the frontal chamber 320. The torso 56 of the occupant 50 has engaged the torso receiving area 380 of the frontal chamber 320. The releasable coupling mechanisms (not shown, but see, e.g., 324 and 326 in FIG. 3C) have released or partially released as the frontal chamber 320 received the occupant 50 and rotated forward and downward.

In this embodiment, the lateral chambers 330, 340 are disposed laterally relative to the shoulders 54 of the occupant 50. In other embodiments, the lateral chambers 330, 340 may be disposed at least partially over the shoulders 54 of the occupant 50 prior to engagement and ride down. As depicted in FIG. 3E, the lower portions of the two lateral chambers 330, 340 are, relative to the occupant 50, outboard of the shoulders 54 of the occupant 50 during ride down. The disposition of the two lateral chambers 330, 340 outboard (relative to the occupant 50) of the shoulders 54 may assist the frontal chamber 320 in conforming to the occupant 50 during engagement and ride down. The lateral chambers 330, 340, along with the frontal chamber 320, may cushion the occupant 50 from impact with vehicle structures. In other words, the frontal chamber 320 may prevent the occupant 50 from striking the dashboard 11, and, in combination with the lateral chambers 330, 340, may prevent the occupant 50 from striking other vehicle structures.

In some embodiments, the seat back 36 may be fixed, or unadjustable. In other embodiments, the seat back 36 may be adjustable. In some embodiments with an adjustable seat back 36, the adjustment mechanism (not shown) may be such that the seat back 36 is rigidly locked when not being adjusted. In other embodiments, the seat back 36 may not be rigidly fixed while not being adjusted. In embodiments in which the seat back 36 is not rigidly fixed while not being adjusted, a locking mechanism (not shown) may be included which locks the seat back 36 in its then-current position. A locking mechanism may be triggered by any sensor (not shown) which may be involved in initiating deployment of the airbag assembly 300.

Figure 4A:
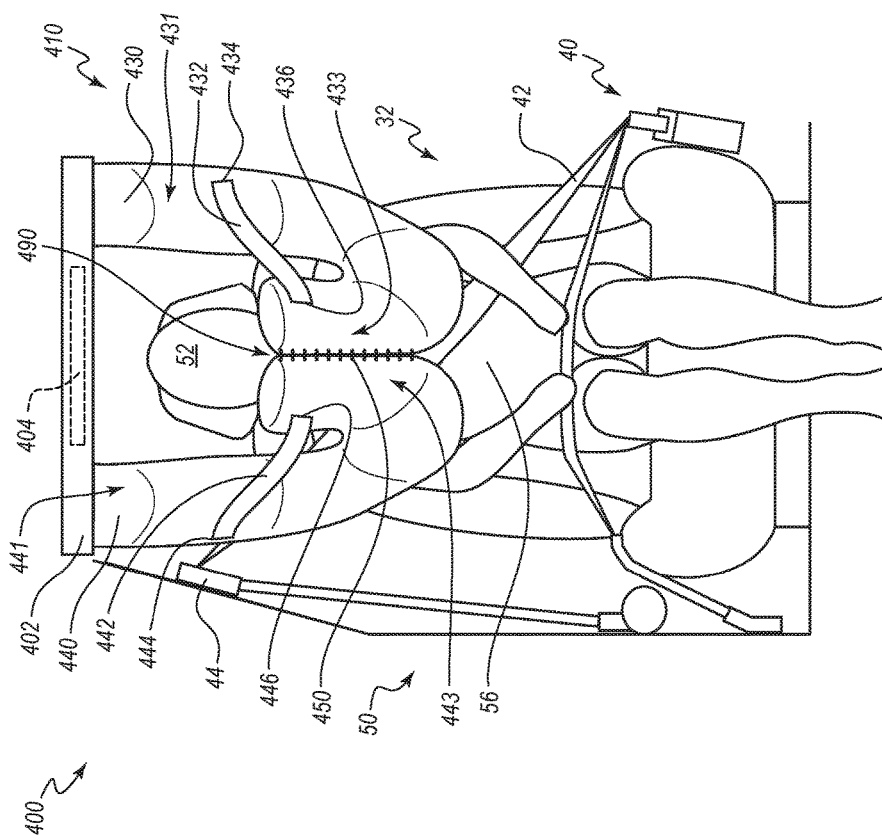
FIG. 4A is a frontal view of another embodiment of an inflatable airbag system in a deployed configuration.

FIG. 4A is a frontal view of an airbag assembly 400 in a deployed state. In the embodiment shown, the airbag assembly 400 is mounted to the roof (not shown, but see, e.g., 14 on FIG. 1A) of a vehicle. The airbag assembly 400 includes at least a housing 402, an inflator 404, and an airbag cushion 410. In FIG. 4A, the airbag cushion 410 has been deployed from the housing 402 by operation of the inflator 404. In the embodiment shown, the occupant 50 may be restrained or partially restrained by the harness system 40. Relevant to the present disclosure, the harness system 40 includes at least the harness strap 42 and the upper anchor 44. The upper anchor 44 may be coupled to the vehicle in such a way that the harness strap 42 crosses the torso 56 of the occupant 50 before traveling over the shoulder (not shown, but see, e.g., 54 in FIG. 4B) to couple at the harness upper anchor 44.

The airbag cushion 410 includes a first lateral chamber 430 and a second lateral chamber 440. The two lateral chambers 430, 440 are each substantially U-shaped. The first later chamber 430 is disposed inboard of the occupant 50. The second lateral chamber 440 is disposed outboard of the occupant 50. In some embodiments, the two lateral chambers 430, 440 may have a generally circular cross-section throughout. In other embodiments, the two lateral chambers 430, 440 may have a variable cross-section. For example, in at least one embodiment, the cross-section of each lateral chamber 430, 440 may be generally similar to that of the lateral chambers 130, 140 in FIG. 1C near the housing 402 and may vary with distance to become more circular. The first lateral chamber 430 includes a proximal portion 431 (relative to the housing 402) and a distal portion 433. Similarly, the second lateral chamber 440 includes a proximal portion 441 and a distal portion 443.

Each lateral chamber 430, 440 may be formed so as to deploy forward of the occupant 50 and/or curve upward in front of the occupant 50. The distal portions 433, 443 of the two lateral chambers 430, 440 may be coupled to each other by means of a seam 450 to form a receiving area 490 for the occupant 50. The seam 450 may be formed by sewing, taping, adhesive, RF welding, or any suitable manner. In an embodiment in which the two lateral chambers 430, 440 have a circular cross-section, the seam 450 may not be along a defined edge but in a region of the surface of the distal portion 433, 443 of each lateral chamber 430, 440 nearest the surface of the opposite lateral chamber 430, 440. In an embodiment employing a different cross-section for the two lateral chambers 430, 440, the seam 450 may be along an edge of the distal portions 433, 443 of the lateral chambers 430, 440. In at least some embodiments, the seam 450 is not a releasable seam and will not part under the energies/forces of a collision.

The two lateral chambers 430, 440 may deploy such that the distal portions 433, 443 are capable of rotating forward and downward in order cushion the occupant 50. In other words, the proximal portions 433, 443, during contact with the occupant 50 and through ride down, may rotate forward and downward relative to the proximal portions 431, 441. Each of the lateral chambers 430, 440 may include an external tether 432, 442. The external tether 432 couples to the first later chamber 430 at an upper tether anchor 434 at or near the proximal portion 431 and at a lower tether anchor 436 at or near the distal portion 433. The external tether 442 couples to the second lateral chamber 440 at an upper tether anchor 444 at or near the proximal portion 441 and at a lower tether anchor 446 at or near the distal portion 443. Each tether 432, 442 spans the top of a "U" formed by the respective lateral chamber 430, 440. In at least some embodiments, the two tethers 432, 442 may be expandable tethers. That is, each external tether 432, 442 may have a predetermined maximum length at the time of construction, which length may be shortened by means of releasable seams (not shown). Such releasable seams may give the external tethers 432, 442 an accordion-like form. In some embodiments, each seam of the releasable seams of the external tethers 432, 442 may be formed so as to release only upon the application of a predetermined energy quantum. That is, each seam may release in sequence dependent on the forces applied to the tethers 432, 442 during engagement by the occupant 50 and ride down. In other embodiments, the releasable seams may be connected to each other such that they release in sequence, individually, over a period of time so long as a predetermined minimum quantum of energy is present. In yet other embodiments, the tethers 432, 442 may connect to the respective tether anchors 434, 436, 444, 446 by a series of likewise releasable seams. In such an embodiment, the seam at each extreme end of the tethers 432, 442 may be a fixed, non-releasable seam to prevent the tether 432, 442 from totally releasing from the proximal portions 431, 441 and the distal portions 433, 443 of the lateral chambers 430, 440.

The seam 450 and the external tethers 432, 442 may help to properly dispose the airbag cushion 410 to receive the occupant 50 during a collision. More specifically, the seam 450 may help to draw the distal portions 433, 443 of the two lateral chambers 430, 440 together in front of the occupant 50, while the two external tethers 432, 442 may help to properly dispose the receiving area 490 in front of the occupant 50.

Figure 4B:
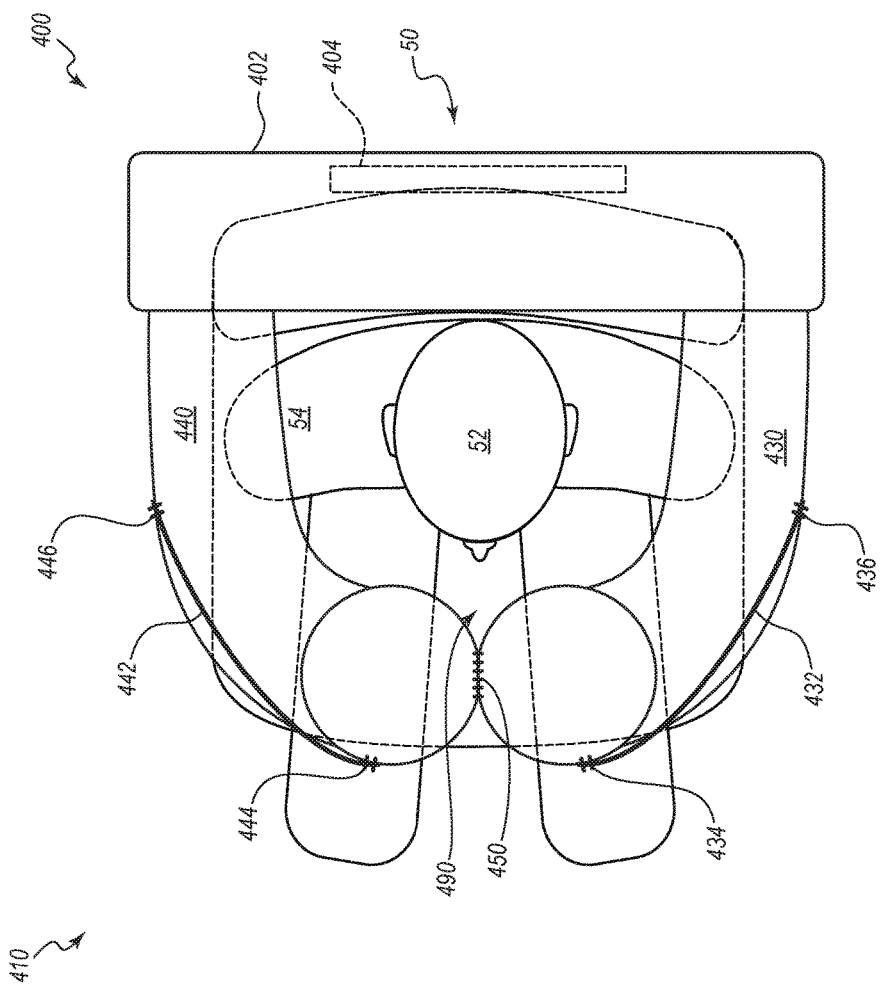
FIG. 4B is an overhead view of the inflatable airbag system of FIG. 4A in the deployed configuration.

FIG. 4B is an overhead view of the airbag assembly 400 of FIG. 4A in a deployed state. The airbag cushion 410 has been deployed from the housing 402 by operation of the inflator 404. The first lateral chamber 430 is disposed inboard of the head 52 of the occupant before coming forward and meeting the forward aspect of the second lateral chamber 440 in front of the occupant 50. The second lateral chamber 440 is disposed outboard of the head 52 of the occupant 50 before coming forward and meeting the forward aspect of the first lateral chamber 430 in front of the occupant 50.

The two lateral chambers 430, 440 couple at the seam 450. In at least some embodiments, the seam 450 may include a series of vertical seams positioned adjacent (from front to rear) to each other. In other embodiments, the seam 450 may include a series of horizontal seams positioned one above/below its adjacent seam(s). The seam 450 may assist the lateral chambers 430, 440 in forming the occupant receiving area 490. The first lateral chamber 430 may include the tether 432, and the second lateral chamber 440 may include the tether 442. The tether 432 couples to the first lateral chamber 430 at the tether anchors 434 and 436. The tether 442 couples to the second lateral chamber 440 at the tether anchors 444 and 446. The tethers 432, 442 and the tether anchors 434, 436, 444, 446 are further described in the discussion of FIG. 4A.

Figure 4C:
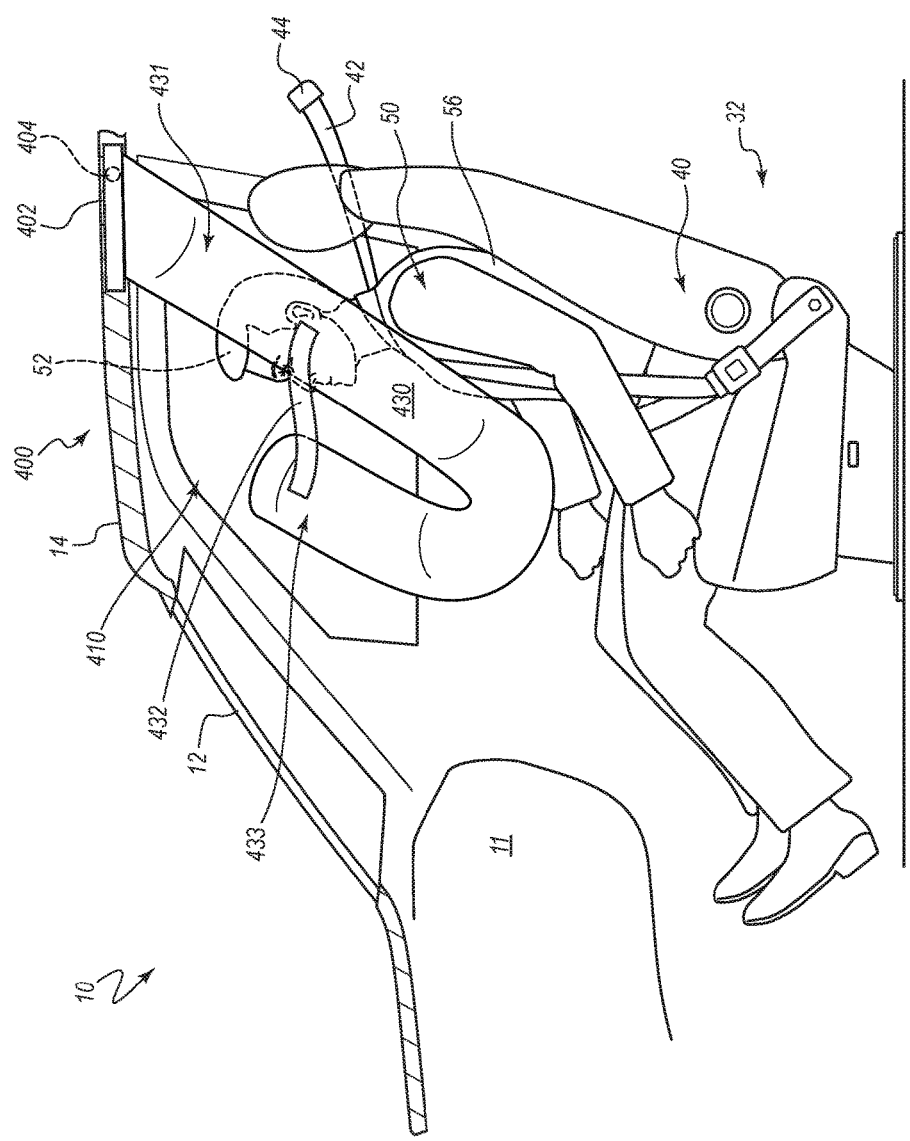
FIG. 4C is a partial side view of an interior of a side of a vehicle having the inflatable airbag system of FIG. 4A in the deployed configuration.

FIG. 4C is a partial side view of the interior of the side of the vehicle 10, showing the airbag assembly 400 of FIG. 4A in the deployed state. The dashboard 11, windshield 12, roof 14, and seat assembly 32 are shown for reference. The airbag cushion 410 has been deployed from the housing 402 by operation of the inflator 404. The housing 402 is mounted to or in the roof 14. The first lateral chamber 430 is depicted in a fully inflated and deployed state prior to engagement by the occupant 50. The second lateral chamber (not shown, but see, e.g., 440 in FIGS. 4A and 4B) is likewise fully inflated and deployed. The forward aspects of the two lateral chambers 430, 440 are disposed forward of the occupant 50 by operation of the coupling seam (not shown, but see, e.g., 450 in FIGS. 4A and 4B). The tether 432 is shown as it may appear in at least one embodiment.

The occupant 50 is at least partially restrained by the restraint harness system 40. The restraint harness system 40 includes at least the harness strap 42 and harness upper anchor 44. The harness strap 42 travels across the front of the torso 56 of the occupant 50, then over the outboard shoulder (not shown, but see, e.g., 54 in FIG. 4B) to couple at the harness upper anchor 44. The harness strap 42 does not interfere with airbag cushion 410, nor does the airbag cushion 410 interfere with the harness strap 42.

Figure 4D:
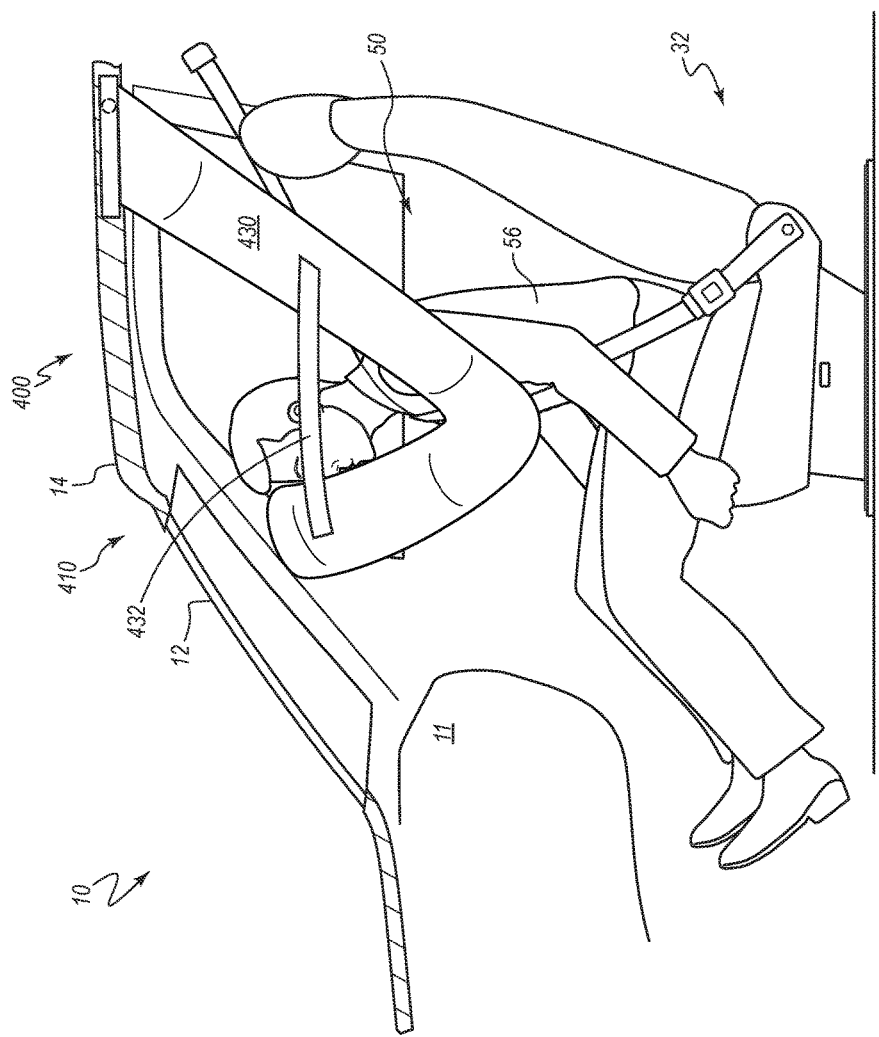
FIG. 4D is a partial side view of the interior of the side of the vehicle having the inflatable airbag system of FIG. 4C in the deployed configuration during ride down.

FIG. 4D is a partial side view of the interior of the side of the vehicle 10, showing the airbag assembly 400 of FIG. 4C in a deployed state and during ride down. The dashboard 11, windshield 12, roof 14, and seat assembly 32 are shown for reference. The occupant 50 has engaged the airbag cushion 410. The first lateral chamber 430 and second lateral chamber (not shown, but see, e.g., 440 in FIGS. 4A and 4B), being coupled at the seam (not shown, but see, e.g., 450 in FIGS. 4A and 4B), have rotated forward and downward to conform to the occupant 50 during ride down following a collision event. The tethers 432 and 442 (see, e.g., 442 in FIGS. 4A and 4B) have released or partially released to assist in supporting and cushioning the occupant 50 during ride down. More specifically, the releasable seams (not shown) of the tethers 432, 442 have been released or partially released.

The configuration of the airbag cushion 410 may prevent the occupant 50 from striking the dashboard 11 or other structures of the vehicle 10. In particular, the configuration of the tethers 432, 442 may provide support to the forward aspect of the two lateral chambers 430, 440 such that the two lateral chambers 430, 440 may cushion the occupant 50 and prevent impact with the dashboard 11 or other structures of the vehicle 10, thereby reducing or preventing at least some injuries.

Figure 5:
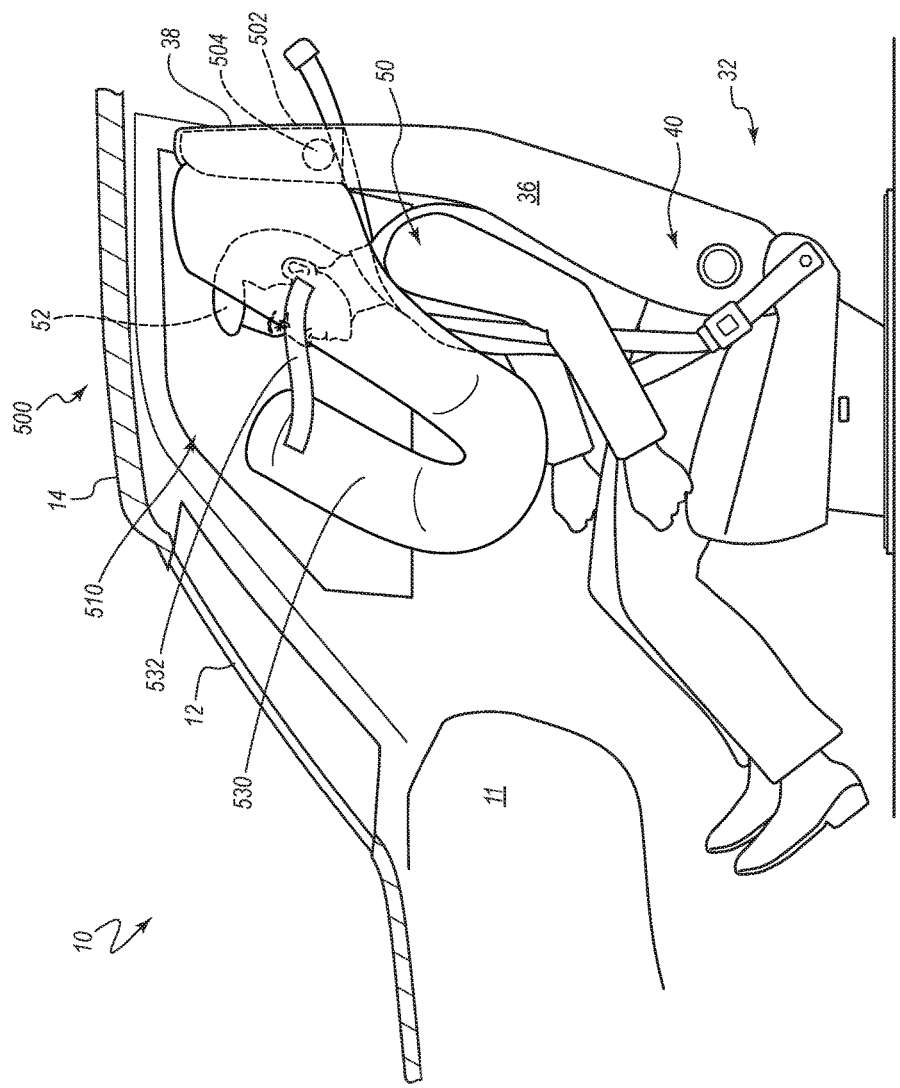
FIG. 5 is a partial side view of an interior of a side of a vehicle having another embodiment of a seat back-mounted inflatable airbag system in a deployed configuration.

FIG. 5 is a partial side view of the interior of the side of the vehicle 10, showing a seat back-mounted airbag assembly 500 (similar to the airbag assembly 400 of FIG. 4A) in a deployed state. The dashboard 11, windshield 12, roof 14, seat assembly 32 and restraint harness system 40 are shown for reference. In the embodiment shown, the airbag assembly 500 is mounted in the head rest 38 of the seat back 36. In another embodiment, such as one in which there is not a defined head rest, the airbag assembly 500 may be mounted in the seat back 36.

An airbag cushion 510 has been deployed from a housing 502 by operation of an inflator 504. A first lateral chamber 530 is depicted in a fully inflated and deployed state prior to engagement by the occupant 50. A second lateral chamber 540 (not shown, but see, e.g., 440 in FIGS. 4A and 4B) is likewise fully inflated and deployed. The forward aspects of the two lateral chambers 530, 540 are disposed forward of the occupant 50 by operation of a coupling seam (not shown, but see, e.g., 450 in FIGS. 4A and 4B). A tether 532 is shown as it may appear in at least one embodiment.

Throughout this specification, the phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other.

As used herein, "inboard" refers to a direction toward a centerline of a vehicle, and "outboard" refers to a direction out of the vehicle and away from a centerline of the vehicle.

The phrase "attached to" or "attached directly to" refer to interaction between two or more entities that are in direct contact with each other and/or are separated from each other only by a fastener of any suitable variety (e.g., mounting hardware or an adhesive).

The terms "engaged by" and "engagement with" as used in this disclosure generally refer to any interaction between two or more entities, and this interaction may, or may not, occur in a particular manner or fashion, or at a particular time. Such interaction between the entities may not be requisite to a particular purpose or claim of the instant disclosure. For example, an airbag cushion may be "engaged by" or in "engagement with" a vehicle occupant during a portion of a collision event. Such "engagement" may, or may not, occur as a result of the airbag cushion deploying, or the occupant impacting upon the airbag cushion, or during ride down following the collision.

The phrase "ride down" as used in this disclosure bears the ordinary meaning of the words relative to inflatable airbag systems. That is, "ride down" typically involves an occupant in contact with an inflatable airbag cushion for some period of time during which the inflatable airbag cushion may support and nominally protect to some degree the occupant from impact(s) with some structure(s)/component(s) of a vehicle, and during which the inflatable airbag cushion may partially deflate to ameliorate deceleration forces.

The phrase "fluid communication" is used in its ordinary sense, and is broad enough to refer to arrangements in which a fluid (e.g., a gas or a liquid) can flow from one element to another element when the elements are in fluid communication with each other.

The terms "a" and "an" can be described as one, but not limited to one. For example, although the disclosure may recite an airbag having "a chamber," the disclosure also contemplates that the airbag can have two or more chambers.

The terms "longitudinal" and "longitudinally" refer to a direction or orientation extending or spanning between a front of a vehicle and a rear of the vehicle.

As used herein, the terms "forward" and "rearward" are used with reference to the front and back of the relevant vehicle. For example, an airbag cushion that deploys in a rearward direction deploys toward the back of a vehicle. Furthermore, other reference terms, such as "horizontal," are used relative to a vehicle in which an airbag assembly is installed, unless it is clear from context that a different reference frame is intended. Thus, a term such as "horizontal" is used relative to the vehicle, whether or not the vehicle itself is oriented horizontally (e.g., is positioned upright on level ground) or angled relative to true horizontal (e.g., is positioned on a hill).

Unless otherwise stated, all ranges include both endpoints and all numbers between the endpoints.

The phrases "vehicle occupant position" and "vehicle seating position" may be used interchangeably herein and refer to a position in which an occupant is generally positioned when seated in a seat of a vehicle. The term "occupant" refers to a person or crash test dummy within a vehicle.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 ¶ 6. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. An airbag assembly comprising:
a housing assembly to be mounted at one of a headrest and a seatback and above a vehicle occupant position of a vehicle;
an inflator; and
an inflatable cushion that defines a void that is configured to receive inflation gas from the inflator to expand the inflatable cushion from a packaged state within the housing assembly to a deployed state, wherein the inflatable cushion is configured to deploy around a portion of the vehicle occupant position, the inflatable cushion comprising:
a first lateral chamber to deploy at a first lateral side of the vehicle occupant position;
a second lateral chamber to deploy at a second lateral side disposed opposite of the first lateral side; and
a frontal chamber to deploy to be disposed between the first and second lateral chambers and forward of the vehicle occupant position, the frontal chamber configured to receive a head and at least a portion of a torso of a vehicle occupant moving from the vehicle occupant position in a forward direction relative to the vehicle during a vehicle impact event,
wherein the frontal chamber is configured to rotate forward independent of the first and second lateral chambers.

2. The airbag assembly of claim 1, wherein an upper edge of the frontal chamber is not coupled to the housing assembly.

3. An airbag assembly comprising:
a housing assembly configured to be mounted at one of a headrest and a seatback and above a vehicle occupant position of a vehicle;
a first lateral chamber defining an inflatable void that is configured to receive inflation gas from an inflator assembly disposed within the housing assembly to transition the first lateral chamber from a packaged state to a deployed state, wherein the first lateral chamber is configured to deploy at a first lateral side of the vehicle occupant position;
a second lateral chamber defining an inflatable void that is configured to receive inflation gas from the inflator assembly to transition the second lateral chamber from a packaged state to a deployed state, wherein the second lateral chamber is configured to deploy at a second lateral side disposed opposite of the first lateral side; and
a frontal chamber defining an inflatable void that is configured to receive inflation gas from the inflator assembly to transition the frontal chamber from a packaged state to a deployed state, wherein the frontal chamber is configured to deploy forward of the vehicle occupant position and between the first and second lateral chambers and to rotate forward independent of the first and second lateral chambers.

4. The airbag assembly of claim 3, wherein the frontal chamber is in fluid communication with the first lateral chamber at a first coupling portion, and wherein the frontal chamber is in fluid communication with the second lateral chamber at a second coupling portion.

5. The airbag assembly of claim 4, wherein the frontal chamber comprises:
an upper portion disposed above the first and second coupling portions, the upper portion configured to receive at least a portion of a head of a vehicle occupant moving from the vehicle occupant position in a forward direction relative to the vehicle during a vehicle impact event; and
a lower portion disposed below the first and second coupling portions, the lower portion configured to receive at least a portion of a torso of the vehicle occupant.

6. The airbag assembly of claim 3, wherein the first lateral chamber comprises a non-inflatable region disposed in a middle portion of the first lateral chamber, and wherein the second lateral chamber comprises a non-inflatable region disposed in a middle portion of the second lateral chamber.

7. The airbag assembly of claim 1, wherein an upper edge of the frontal chamber is releaseably coupled to the first lateral chamber and the second lateral chamber.

8. The airbag assembly of claim 3, wherein an upper edge of the frontal chamber is releaseably coupled to the first lateral chamber and the second lateral chamber.

* * * * *